United States Patent [19]

Dave et al.

[11] Patent Number: 5,320,854
[45] Date of Patent: Jun. 14, 1994

[54] CHEWING GUM CONTAINING STABILIZED HYGROSCOPIC INGREDIENTS

[75] Inventors: Jayant C. Dave, Bloomingdale; Mansukh M. Patel, Downers Grove; Henry T. Tyrpin, Midlothian, all of Ill.

[73] Assignee: Wm. Wrigley Jr. Company, Chicago, Ill.

[21] Appl. No.: 992,843

[22] Filed: Dec. 16, 1992

[51] Int. Cl.⁵ .............................................. A23G 3/30
[52] U.S. Cl. .......................................... 426/3; 426/74
[58] Field of Search ...................................... 426/3–6, 426/74

[56] References Cited

U.S. PATENT DOCUMENTS

| | | | |
|---|---|---|---|
| 4,208,431 | 6/1980 | Friello et al. | 426/3 |
| 4,217,368 | 8/1980 | Witzel et al. | 426/5 |
| 4,582,707 | 4/1986 | Calabro | 426/3 |
| 4,889,726 | 12/1989 | Dave et al. | 426/3 |
| 4,889,727 | 12/1989 | Dave et al. | 426/3 |
| 5,084,298 | 1/1992 | Hussein et al. | 426/3 |
| 5,139,794 | 8/1992 | Patel et al. | 426/3 |
| 5,156,865 | 10/1992 | Gudas et al. | 426/3 |

*Primary Examiner*—Jeanette Hunter
*Attorney, Agent, or Firm*—Willian Brinks Hofer Gilson & Lione

[57] ABSTRACT

A method of making a hygroscopic chewing gum is provided which results in improved gum texture, better dimensional stability and reduced moisture pick-up by the hygroscopic ingredients. The hygroscopic ingredients are added and blended with the gum base in a mixer, for at least about one minute before the bulk sweeteners are added. Fats and/or emulsifiers, and colors, may be added along with the hygroscopic ingredients and blended with the gum base. After the hygroscopic ingredients have been mixed with the gum base, bulk sweeteners and other chewing gum ingredients are added to the mixer and blended.

21 Claims, 1 Drawing Sheet

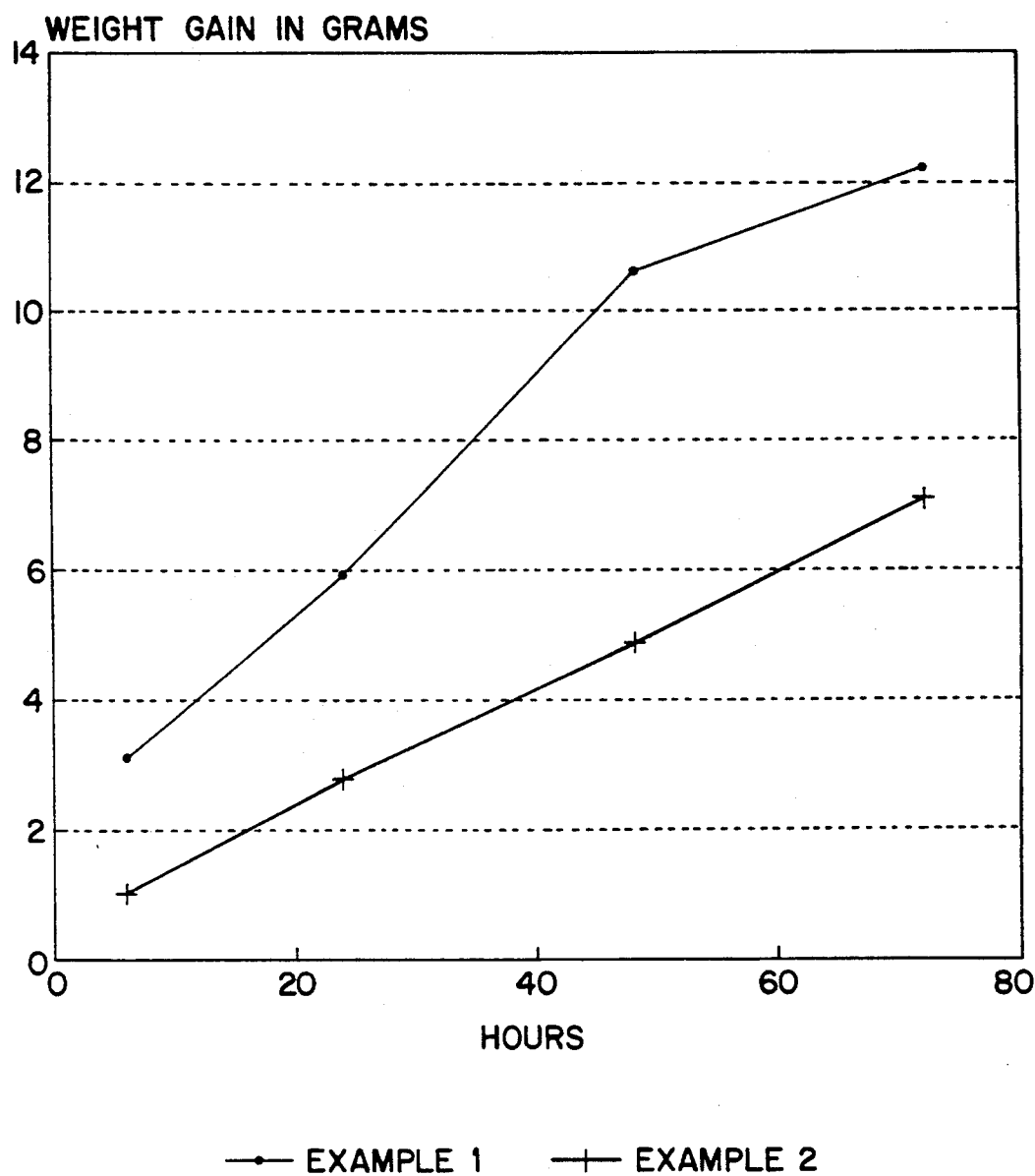

CHEWING GUM CONTAINING STABILIZED HYGROSCOPIC INGREDIENTS

FIELD OF THE INVENTION

This invention is directed to a method of preparing hygroscopic chewing gum which improves the stability of the hygroscopic ingredients contained therein. This invention is also directed to hygroscopic chewing gums prepared using this method.

BACKGROUND OF THE INVENTION

Hygroscopic ingredients in chewing gum cause the chewing gum to pick up and absorb moisture during and after manufacture. Excessive moisture pick-up, occurring in chewing gum containing significant quantities of hygroscopic ingredients, can soften these gums causing wrapping difficulties and slower processing of the gums. Moisture pick-up, and the resulting softening, can also cause the gum to spread during sheeting, making it difficult to maintain proper length and width of the chewing gum sheets.

The hygroscopic chewing gum ingredients which can cause these processing difficulties after absorbing moisture, include particularly sodium chloride, ammonium chloride, potassium chloride, calcium chloride, and other chloride salts, salt substitutes and mixtures thereof. Other hygroscopic ingredients can cause these processing difficulties to a lesser extent, including licorice powder, powdered fruit, spray dried fruit flavors, cocoa powder, powdered onion and garlic, brown sugar, dried honey solids and corn syrup solids. Ordinarily, processing difficulties do not occur in chewing gums which contain very minor quantities of one or more hygroscopic ingredients. The excessive moisture pick-up, and the resulting processing difficulties, are most apparent for chewing gums containing more than 2% by weight hygroscopic ingredients, and particularly for chewing gums containing more than 3% by weight hygroscopic ingredients. Chewing gums containing more than 2% by weight hygroscopic ingredients are referred to herein as "hygroscopic chewing gums."

U.S. Pat. No. 5,139,974, issued to Patel et al., discloses the use of encapsulated salts to enhance flavor and sweetness of chewing gum. The salt, which can include a blend of about 1 to 4 parts by weight sodium chloride per part by weight potassium chloride, is coated or encapsulated to provide a delayed release. The salt, which constitutes about 0.01–0.5 weight percent of the gum, can be pre-mixed with molten chewing gum base to eliminate a "moist spot" problem caused by hygroscopicity of the salt. The base is then cooled and solidified before being added to the chewing gum formula.

U.S. Pat. No. 4,889,727, issued to Dave et al., discloses using a minor quantity of cocoa powder to enhance the flavor of a synthetic chewing gum base. The amount of cocoa powder is limited to levels which do not impart a noticeable chocolate flavor to the chewing gum and cannot, in any event, exceed about 2.4 percent of the gum base.

U.S. Pat. No. 4,208,431, issued to Friello et al., and U.S. Pat. No. 4,217,368, issued to Witzel et al., both disclose the addition of particulated sweeteners to a chewing gum base, in order to achieve delayed release. Included among the mentioned sweeteners are the ammonium, sodium and potassium salts of glycyrrhizin.

SUMMARY OF THE INVENTION

The present invention is directed to a method of improving the stability of hygroscopic chewing gum which involves adding the hygroscopic ingredients to the chewing gum during the early stages of mixing with the chewing gum base, before most other ingredients are added. Presently, it is standard practice to add hygroscopic ingredients after part of the bulk sweeteners have been added to and mixed with the base. However, it has been discovered that addition of hygroscopic ingredients during the early stages of gum manufacture causes the chewing gum to exhibit improved dimensional stability during sheeting and also to have a firmer texture which does not cause difficulties during wrapping.

Furthermore, it has been discovered that hygroscopic chewing gum prepared according to the method of the invention picks up and absorbs moisture at a much slower rate than hygroscopic chewing gum of identical composition, which is prepared according to standard methods. Therefore, the present invention is also directed to hygroscopic chewing gum compositions which have been prepared according to the method of the invention.

The method of the invention is particularly useful for making hygroscopic chewing gums which include at least about 2% by weight of hygroscopic ingredients including, but not limited to, ammonium chloride, sodium chloride, potassium chloride, calcium chloride and other chloride salts, salt substitutes and mixtures thereof. Previously, these hygroscopic ingredients were among the most troublesome in terms of moisture pick-up and softening of the gum. However, the method of the invention is also useful for making hygroscopic chewing gums which include at least about 2% by weight of other hygroscopic ingredients including, but not limited to, licorice powder, powdered fruit, spray dried flavors, cocoa powder, powdered onion and garlic, brown sugar, dried honey solids and corn syrup solids. Also, the method of the invention is useful for preparing both hygroscopic wax-containing and wax-free chewing gums.

With the foregoing in mind, it is a feature and advantage of the invention to provide a method of making improved hygroscopic chewing gums, which have firmer texture and greater dimensional stability than otherwise identical hygroscopic chewing gums prepared using standard methods.

It is also a feature and advantage of the invention to provide improved hygroscopic chewing gums prepared according to the method of the invention, which pick up and absorb moisture more slowly than otherwise identical hygroscopic chewing gums prepared according to standard methods.

The foregoing and other features and advantages of the invention will become further apparent from the following detailed description of the presently preferred embodiments, when read in conjunction with the accompanying examples and figure. The following detailed description, examples and figure are intended to be illustrative rather than limitative, with the scope of the invention being defined by the appended claims and equivalents thereof.

BRIEF DESCRIPTION OF THE FIGURE

FIG. 1 shows the moisture pick-up as a function of time for two samples of salty licorice gum, one prepared according to the method of the invention and the other prepared according to a conventional method.

DETAILED DESCRIPTION OF THE PRESENTLY PREFERRED EMBODIMENTS

In accordance with the invention, a method is provided for making hygroscopic chewing gum which improves the texture and dimensional stability, and reduces the moisture absorption, of the chewing gum. This is accomplished by adding the hygroscopic ingredients during the early stages of chewing gum manufacture, i.e., by adding the hygroscopic ingredients to the chewing gum base before most other chewing gum ingredients are added. Specifically, the method of the invention includes the following steps, in sequence.

First, the gum base and the hygroscopic portion are added to a standard chewing gum running mixer, such as a sigma blade mixer. The hygroscopic ingredients are added together with the gum base, or immediately after the gum base. Also, a fat or emulsifier may be added at the same time as the hygroscopic ingredients, regardless of whether the hygroscopic ingredients are added with the gum base or immediately afterwards. Colors can also be added at this time. Except for the fat or emulsifier, and colors, no other ingredients are added at this time.

In a preferred embodiment, the amount of hygroscopic ingredients added with the gum base or immediately afterwards, will constitute at least about 2% by weight of the chewing gum being made. Most preferably, the hygroscopic ingredients added at this stage will constitute at least about 3% by weight of the chewing gum being made. These hygroscopic ingredients preferably include one or more of ammonium chloride, sodium chloride, potassium chloride, calcium chloride, other chloride salts and salt substitutes, licorice powder, powdered fruit, spray dried fruit flavors, cocoa powder, powdered onion and garlic, brown sugar, dried honey solids, corn syrup solids and mixtures thereof. Most preferably, these hygroscopic ingredients include one or more of sodium chloride, potassium chloride, calcium chloride, other chloride salts and salt substitutes, and combinations thereof.

In a preferred embodiment, a quantity of fat or emulsifier is added to the mixer at the same time as the hygroscopic ingredients. Preferably, the fat/emulsifier which is added at this time will constitute about 0.5 to about 15 weight percent of the chewing gum being made, most preferably about 1 to about 10 weight percent of the hygroscopic chewing gum. These fats or emulsifiers may include lecithin, acetylated monoglyceride, glycerol monostearate, distilled monoglycerides, propylene glycol monoester, succinylated monoglycerides, glyceryl lactopalmitate, sorbitan monostearate, triglyceride monostearates, octaglycerol monooleate, polysorbates 65, 66 and 80, and mixtures thereof. The preferred fat or emulsifier to be added with the hygroscopic ingredients is lecithin. The purpose of adding a fat or emulsifier at this stage is to enable the hygroscopic ingredients to be dispersed more easily and homogeneously within the gum base. The fat/emulsifier serves as a compatibilizer between the hygroscopic ingredients and the gum base.

Next, the gum base, hygroscopic ingredients, and, optionally fat or emulsifier are blended together before any further ingredients are added. Preferably, these components are blended together for at least one minute, most preferably about three minutes, before any further ingredients are added. The purpose of this blending step is to ensure a significant degree of dispersion of the hygroscopic ingredients within the gum base. It is believed that the gum base, which itself is water insoluble, helps protect the hygroscopic ingredients from being exposed to significant quantities of moisture entering the chewing gum from the atmosphere. These hygroscopic ingredients, which normally have a strong affinity for moisture, are less susceptible to moisture absorption when surrounded by a matrix of water insoluble (and relatively water impermeable) chewing gum base.

Next, the remaining chewing gum ingredients can be added to the mixer and blended in accordance with standard procedures described below, to produce a chewing gum mass. The method of the invention can be used to produce any of the standard chewing gum products described below, using any wax-containing or wax-free chewing gum base. However, the method of the invention is most useful for the manufacture of hygroscopic chewing gums which, as explained above, generally contain about 2% by weight or more of hygroscopic ingredients.

A chewing gum composition generally includes a water-soluble bulk portion, a water insoluble chewing gum base portion, and one or more flavoring agents. The water soluble portion dissipates over a period of time during chewing, along with part of the flavoring agents. The gum base portion remains in the mouth throughout the chewing process.

The insoluble gum base generally includes elastomers, resins, fats, oils, softeners and inorganic fillers and, optionally, waxes. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The present invention contemplates the use of either a wax-containing or wax-free chewing gum base. For purposes of illustration, a typical wax-free and wax-containing gum base formula are provided below. The invention is not limited to the use of these gum bases, which are included only to facilitate a better understanding of the technology.

| Component | Weight Percent Of Gum Base |
|---|---|
| Typical Wax-Containing Gum Base | |
| Polyvinyl acetate | 27 |
| Synthetic rubber | 13 |

| Component | Weight Percent Of Gum Base |
|---|---|
| Paraffin wax | 13 |
| Fat | 3 |
| Glycerol Monostearate | 5 |
| Terpene Resin | 27 |
| Calcium carbonate filler | 12 |
| TOTAL | 100% |
| Typical Wax-Free Gum Base | |
| Natural Gum | 22.2 |
| Isoprene isobutylene elastomer | 5.7 |
| Polyvinyl acetate | 22.0 |
| Polyisobutylene elastomer | 3.0 |
| Glycerol esters of partially hydrogenated resin | 15.2 |
| Calcium carbonate | 11.4 |
| Hydrogenated vegetable oil | 17.2 |
| Glycerol monostearate | 3.3 |
| TOTAL | 100% |

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

The flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. The flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, using a temperature generally between about 100°-120° C., the gum mass is discharged from the mixer and shaped into the desired form such as by rolling into sheets and cutting into sticks, extruding into chunks, or casting into pellets. When making the hygroscopic chewing gum of the invention, the ingredients are mixed by first melting the gum base and adding it to the running mixer. The gum base may, alternatively, be melted in the mixer.

The hygroscopic ingredients are added either with the gum base or immediately after the gum base. Fats and emulsifiers, and colors, can also be added at this time. The gum base, hygroscopic ingredients and, optionally, fats and emulsifiers are mixed together for at least about one minute, and preferably about three minutes before the remaining ingredients are added.

A softener such as glycerin can be added next along with syrup and part of the bulk portion. Further parts of the bulk portion can then be added to the mixer. Flavoring agents are typically added with the final part of the bulk portion. The entire mixing process typically takes from five to fifteen minutes, although longer mixing times are sometimes required. Those skilled in the art will recognize that some variations of this mixing procedure can be followed without departing from the spirit and scope of the invention.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

Comparative

A hygroscopic chewing gum was prepared using the following sugar-free salty licorice formulation.

| Component | Weight Percent Of Chewing Gum |
|---|---|
| Xylitol | 35.11 |
| Gum base | 26.50 |
| Sorbitol | 19.846 |
| Mannitol | 7.19 |
| Coevaporated lycasin/ glycerin blend | 4.80 |
| Ammonium chloride | 3.30 |
| Licorice powder | 1.50 |
| Liquid anethole | 0.89 |
| Menthol | 0.50 |
| Aspartame | 0.244 |
| Lecithin | 0.12 |

| -continued | |
|---|---|
| Component | Weight Percent Of Chewing Gum |
| TOTAL | 100.00 |

The above ingredients were mixed in a sigma blade mixer at a temperature of 120° C. and an rpm of 19 for the fast blade and 11 for the slow blade, using a standard addition and mixing procedure. Gum base and lecithin were added to the gum mixer and mixed for two minutes. Sorbitol was then added and mixed into the blend for three additional minutes. The coevaporated lycasin/glycerin blend, ammonium chloride, licorice powder and menthol were then added and mixed into the gum blend for three minutes. Liquid anethole and menthol were then added and mixed into the blend for one minute. Finally, xylitol was added and mixed into the blend for four minutes.

The gum mass was discharged from the mixer and was rolled, sheeted and cut into sticks. However, the gum was quite soft and tended to spread out too quickly and too much, during rolling and sheeting. Thereafter, the dimensional stability was poor.

EXAMPLE 2
Inventive

A chewing gum having an identical composition to that of Example 1 was prepared, except that a different addition and mixing procedure was used. The gum base, lecithin, ammonium chloride and licorice powder were added to the mixer all at once and mixed for three minutes. Then, liquid anethole, menthol and sorbitol were added and mixed into the blend for three additional minutes. The coevaporated lycasin/glycerin blend, aspartame, mannitol and xylitol were then added to the mixer. After letting the ingredients mix for four additional minutes, the gum mass was discharged from the mixer.

The gum mass was rolled, sheeted and cut into sticks. During rolling and sheeting, the gum mass was firmer than that of Example 1, and did not spread out too quickly. Thereafter, the gum exhibited good dimensional stability.

ANALYSIS FOR MOISTURE PICK-UP

Moisture gain studies were performed on the comparative and inventive chewing gum samples. Chewing gum sticks from both Examples 1 and 2 were stored at room temperature and 35%, 50% and 65% relative humidity. The weight of the sticks was measured at zero, 6, 24, 48 and 72 hours. At 35% and 50% relative humidity there was little or no difference in weight gain between the samples. However, at 65% relative humidity, the chewing gum of Example 1 picked up moisture much more quickly than the chewing gum of Example 2. The weight gain for both samples of hygroscopic chewing gum is plotted in FIG. 1, as a function of time, at 65% relative humidity.

As shown in FIG. 1, the inventive hygroscopic chewing gum gained significantly less than 10 grams of moisture per standard chewing gum stick, when stored at 65% relative humidity for 72 hours. More precisely, the inventive hygroscopic chewing gum gained between 6 and 8 grams of moisture per standard chewing gum stick. By comparison, the conventional hygroscopic chewing gum gained significantly more than 10 grams of moisture per standard chewing gum stick, when stored at 65% relative humidity for 72 hours. More precisely, the conventional hygroscopic chewing gum gained between 12 and 14 grams of moisture per standard chewing gum stick. These data indicate a significantly improved stability of hygroscopic ingredients present in hygroscopic chewing gum prepared according to the inventive method. A standard chewing gum stick has a starting weight (before moisture absorption) of about 2.7 to about 3.2 grams.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A method of preparing hygroscopic chewing gum, comprising the steps of:
   a) adding about 10–50% by weight of a chewing gum base portion and at least about 2% by weight of a hygroscopic portion to a chewing gum mixer;
   b) blending the chewing gum base portion together with the hygroscopic portion for at least about one minute before adding any bulk sweetener;
   c) after the chewing gum base portion has been blended with the hygroscopic portion, adding about 20–80% by weight of a bulk sweetener portion to the chewing gum mixer;
   d) adding one or more flavoring agents to the chewing gum mixer; and
   e) blending all of the chewing gum ingredients together in the mixer, to form a chewing gum mass;
   wherein the hygroscopic portion comprises a hygroscopic ingredient selected from the group consisting of ammonium chloride, sodium chloride, potassium chloride, calcium chloride, other chloride salts, licorice powder, powdered fruit, spray dried flavors, powdered onion, garlic, brown sugar, dried honey solids, and mixtures thereof.

2. The method of claim 1, wherein the hygroscopic portion comprises a hygroscopic ingredient selected from the group consisting of ammonium chloride, sodium chloride, potassium chloride, calcium chloride, other chloride salts, and mixtures thereof.

3. The method of claim 1, wherein the hygroscopic portion is added to the mixer at the same time as the chewing gum base portion.

4. The method of claim 1, wherein the hygroscopic portion is added to the mixer immediately after the chewing gum base portion.

5. The method of claim 1, wherein the hygroscopic portion is added in an amount of at least about 3% by weight of the chewing gum.

6. The method of claim 1, further comprising the step of adding a fat/emulsifier to the mixer at the same time as the hygroscopic portion, in an amount of about 0.5–15% by weight of the chewing gum.

7. The method of claim 6, wherein the fat/emulsifier is added in an amount of about 1–10% by weight of the chewing gum.

8. The method of claim 6, wherein the fat/emulsifier is selected from the group consisting of lecithin, acetylated monoglyceride, glycerol monostearate, distilled monoglycerides, propylene glycol monoester, succinylated monoglycerides, glyceryl lactopalmitate, sorbitan monostearate, triglyceride monostearates, octaglycerol monooleate, polysorbates 65, 66 and 80, and mixtures thereof.

9. The method of claim 6, wherein the fat/emulsifier comprises lecithin.

10. The method of claim 1, wherein the chewing gum base is wax-free.

11. The method of claim 1, wherein the chewing gum base includes one or more waxes.

12. A hygroscopic chewing gum prepared according to the method of claim 1.

13. A method of preparing hygroscopic chewing gum, comprising the steps of:
   a) adding about 10–50% by weight of a chewing gum base portion and a hygroscopic ingredient selected from the group consisting of ammonium, chloride, sodium chloride, potassium chloride, calcium chloride, other chloride salts, and mixtures thereof, to a chewing gum mixer;
   b) blending the chewing gum base portion together with the hygroscopic ingredient for at least about one minute;
   c) after the chewing gum base portion has been blended with the hygroscopic ingredient, adding about 20–80% by weight of a bulk sweetener portion to the chewing gum mixer;
   d) adding one or more flavoring agents to the chewing gum mixer; and
   e) blending all of the chewing gum ingredients together in the mixer, to form a chewing gum mass.

14. The method of claim 13, wherein the hygroscopic ingredient comprises ammonium chloride.

15. The method of claim 13, wherein the hygroscopic ingredient is added in an amount of at least 2% by weight of the chewing gum.

16. The method of claim 13, wherein the hygroscopic ingredient is added in an amount of at least 3% by weight of the chewing gum.

17. The method of claim 13, further comprising the step of adding a fat/emulsifier to the mixer at the same time as the hygroscopic ingredient.

18. The method of claim 17, further comprising the step of preblending the fat/emulsifier with the hygroscopic ingredient.

19. The method of claim 17, wherein the fat/emulsifier comprises lecithin.

20. The method of claim 13, wherein the chewing gum base portion is blended with the hygroscopic ingredient for at least about three minutes before the bulk portion is added.

21. A chewing gum prepared according to the method of claim 13.

* * * * *